(12) United States Patent
Tamai et al.

(10) Patent No.: US 6,693,390 B2
(45) Date of Patent: Feb. 17, 2004

(54) LOAD DRIVING APPARATUS

(75) Inventors: Yasuhiro Tamai, Shizuoka-ken (JP); Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/205,390

(22) Filed: Jul. 26, 2002

(65) Prior Publication Data

US 2003/0030420 A1 Feb. 13, 2003

(30) Foreign Application Priority Data

Aug. 7, 2001 (JP) .................................... P 2001-239524

(51) Int. Cl.[7] .............................................. H05B 37/00
(52) U.S. Cl. ....................................... 315/172; 315/175
(58) Field of Search ................................. 315/160, 170, 315/172, 175, 173, 174

(56) References Cited

U.S. PATENT DOCUMENTS

| 4,887,007 A | * 12/1989 | Almering et al. ............ 315/243 |
| 5,028,844 A | * 7/1991 | Sakaguchi et al. ........... 315/160 |
| 6,366,068 B1 | 4/2002 | Morishita |

FOREIGN PATENT DOCUMENTS

| EP | 1 239 574 A2 | 9/2002 |
| JP | 5-168164 | 7/1993 |
| JP | 231251 | 8/2001 |

* cited by examiner

Primary Examiner—Shawn Riley
(74) Attorney, Agent, or Firm—Finnegan, Henderson, Farabow, Garrett & Dunner, L.L.P.

(57) ABSTRACT

A load driving apparatus is constituted with a high voltage power source, a low voltage power source, a first switching element, a second switching element, a lamp load, current detecting section, and PWM control section. The first switching element is connected to the high voltage power source which supplies a high voltage and is connected to the lamp load. The second switching element is connected to the low voltage power source which supplies a low voltage and is connected to the lamp load. The current detecting section detects a value of current flowing in the lamp load. The PWM control section is connected the first switching element, the second switching element, and the current detecting section to control a voltage to be supplied to the lamp load. The PWM control section turns the second switching element in ON state at first, and the low voltage is being supplied to the lamp load while the value of the current detected in the current detecting section is more than a predetermined value. Once the value of current detected by the current detected section becomes below the predetermined value, the PWM control section turns the second switching element in OFF state and drives the first switching element to supply the high voltage converted to a pulse voltage to the lamp load.

6 Claims, 2 Drawing Sheets

LOAD DRIVING APPARATUS

CROSS REFERENCE TO RELATED APPLICATION

This application claims benefit of priority under 35 U.S.C. §119 to Japanese Patent Application No.2001-239524, filed on Aug. 7, 2001, the entire contents of which are incorporated by reference herein.

BACKGROUND OF THE INVENTION

1. Field of the Invention

The present invention relates to a load driving apparatus which is provided with a high voltage power source and which reduces voltage from the high voltage power source to supply the reduced, voltage to a load when driving the load.

2. Description of the Related Art

In recent years, a system, which uses a high voltage power source of 42V connected to a motor/generator advantageous in power consumption, has been developed to drive various loads mounted on an automobile.

However, there are loads such as lamps or CPUs mounted on the automobile to which a high voltage can not be applied. For such a load, a DC/DC converter is used to convert a high voltage to a low voltage of 14V which has been conventionally regulated.

However, the DC/DC converter is an apparatus whose price becomes more expensive according to increase in power to be employed. On the other hand, a load driving apparatus disclosed in Japanese Patent Application Laid-Open (JP-A) 05-168164 is constituted by a lamp load 102, a switching element 103, a variable duty PWM (Pulse Width Modulation) control circuit 104, a voltage fluctuation detecting circuit 105 and a switch 106 to a high voltage power source 101 in series, as shown in FIG. 1.

In the load driving apparatus, the switch 106 is turned in ON state, the switching element 103 is driven according to a PWM control performed in the variable duty PWM control circuit 104 for driving the lamp load 102 by means of the high voltage power source 101. Here, a PWM control means controlling a duty ratio which is a ratio of a time period where power is supplied to the lamp load 102 and a time period where power is not supplied to the lamp load 102, referring to fluctuation of a voltage supplied to the lamp load 102, and detected in the voltage fluctuation detecting circuit 105.

Therefore, the high voltage is converted the low voltage by means of the PWM control. As a result, the lamp load 102 which is a low voltage load driven by a low voltage can be driven by a high voltage, performed the PWM control, from the high voltage power source 101.

Incidentally, since all the loads mounted on an automobile can not be driven by means of the PWM control, the above-described lamp 102 and the like are driven by means of the PWM control and the other loads are driven by means of a DC/DC converter which lowers a high voltage from the high voltage power source.

Thus, since a power supplied to the lamp load 102 can be handled in the load driving apparatus, a power handled in the DC/DC converter can be reduced correspondingly, so that an inexpensive DC/DC converter can be employed.

However, in the conventional load driving apparatus, for converting the high voltage (42V) to the low voltage (14V) by means of the PWM control, when the power supplying time of the duty ratio is set to "1", the time where power is not supplied must be set to "9" or so. In this case, the value of current occurring at a time of start of power supplying reaches about three times that occurring when the low voltage is used.

Particularly, when a rush current generates at a time of start of driving a load, the value of current flowing in the load reaches several hundreds [A]. Therefore, in the conventional art, when a load is driven while PWM control is being performed, it is necessary to use a switching element (for example, an FET (Field Effect Transistor)) which can withstand a rush current or increase the value of current supplied at a time of start of driving the load gradually.

Also, it is necessary to use an expensive switching element with a large size which can withstand a rush current, as compared with a switching element corresponding to a steady current.

In an approach where the value of current supplied at a time of start of driving a load is increased gradually, there is a problem that a circuit is complicated, heat generation of an FET in a transient state occurs and start of driving a load is delayed. Specifically, in case that a lamp is driven as a load, there occurs a problem that it takes much time to turn the lamp ON.

SUMMARY OF THE INVENTION

The present invention has been proposed in view of the above-described circumstances, and it is an object of the present invention to provide a load driving apparatus which reduces a rush current occurring at a time of start of driving a load.

It is another object of the present invention to provide a load driving apparatus which realizes to reduce costs of apparatus and simplify a circuit.

In order to achieve the above object, there is provided a load driving apparatus comprising: a first switching element which is connected to a first power source supplying a first voltage and connected to a load; a second switching element which is connected to a second power source supplying a second voltage lower than the first voltage and connected to the load; current detecting means which detects a value of current flowing in the load; and control means which is connected the first switching element, the second switching element, and the current detecting means to control a voltage to be supplied to the load, wherein the control means turns the second switching element into ON state at first, continues to supply the second voltage from the second power source to the load while the value of current detected by the current detecting means is more than a predetermined value, and turns the second switching element in OFF state and drives the first switching element to supply the first voltage from the first power source to the load once the value of current detected by the current detecting means becomes below the predetermined value.

According to the present invention, the second switching element is turned in ON at first and the second voltage lower than the first voltage is being supplied to the load while the value of current detected by the current detecting means is more than the predetermined value, and the second switching element is turned in OFF and the first switching element is driven to supply the first voltage from the first power source to the load once the value of current becomes below the predetermined value. Therefore, the second voltage lower than the first voltage is supplied to the load at a time of start of driving the load. As a result a rush current generated at a time of start of driving the load is reduced.

In a preferred embodiment of the present invention, direct current voltage converting means which is connected to the first power source and which lowers the first voltage is further provided.

According to the embodiment, the direct current voltage converting means lowers the first voltage. Therefore, overcurrent does not flow in the load and a complex control for suppressing overcurrent or switching element having a large allowable current value is not required. As a result, it is realized to reduce costs of apparatus and simplify a circuit.

In a preferred embodiment of the present invention, the first voltage from the first power source is converted to a pulse voltage by means of the direct current voltage converting means having PWM (Pulse Width Modulation) control and is supplied to the load.

According to the embodiment, since the first voltage is converted to the pulse voltage by the PWM control, a reduced first voltage can be supplied to the load. Therefore, it is realized to reduce costs of apparatus and simplify a circuit.

In a preferred embodiment of the present invention, the current detecting means detects a value of current flowing in a resistor provided between the second switching element and the load.

According to the embodiment, the value of current flowing between the second switching element and the load can be obtained from a voltage drop occurring at the resistor.

In a preferred embodiment of the present invention, the load is a lamp.

According to the embodiment, even when the load is the lamp, a rush current generated at a time of start of driving the lamp can be reduced and it is realized to reduce costs of apparatus and simplify a circuit.

In a preferred embodiment of the present invention, the predetermined value is set to a value indicating that the load has become a steady state.

According to the embodiment, as the predetermined value is set to the value indicating that the load has become a steady state, the second voltage, lower than the first voltage, is supplied to the load before the load becomes a steady state, and the first voltage is supplied to the load once the load becomes a steady state. Therefore, a rush current generated at a time of start of driving the lamp can be reduced and it is realized to reduce costs of apparatus and simplify a circuit.

DESCRIPTION OF THE PREFERRED EMBODIMENTS

An embodiment of a load driving apparatus according to the present invention will be explained in detail below with reference to the drawings.

Figure 2:
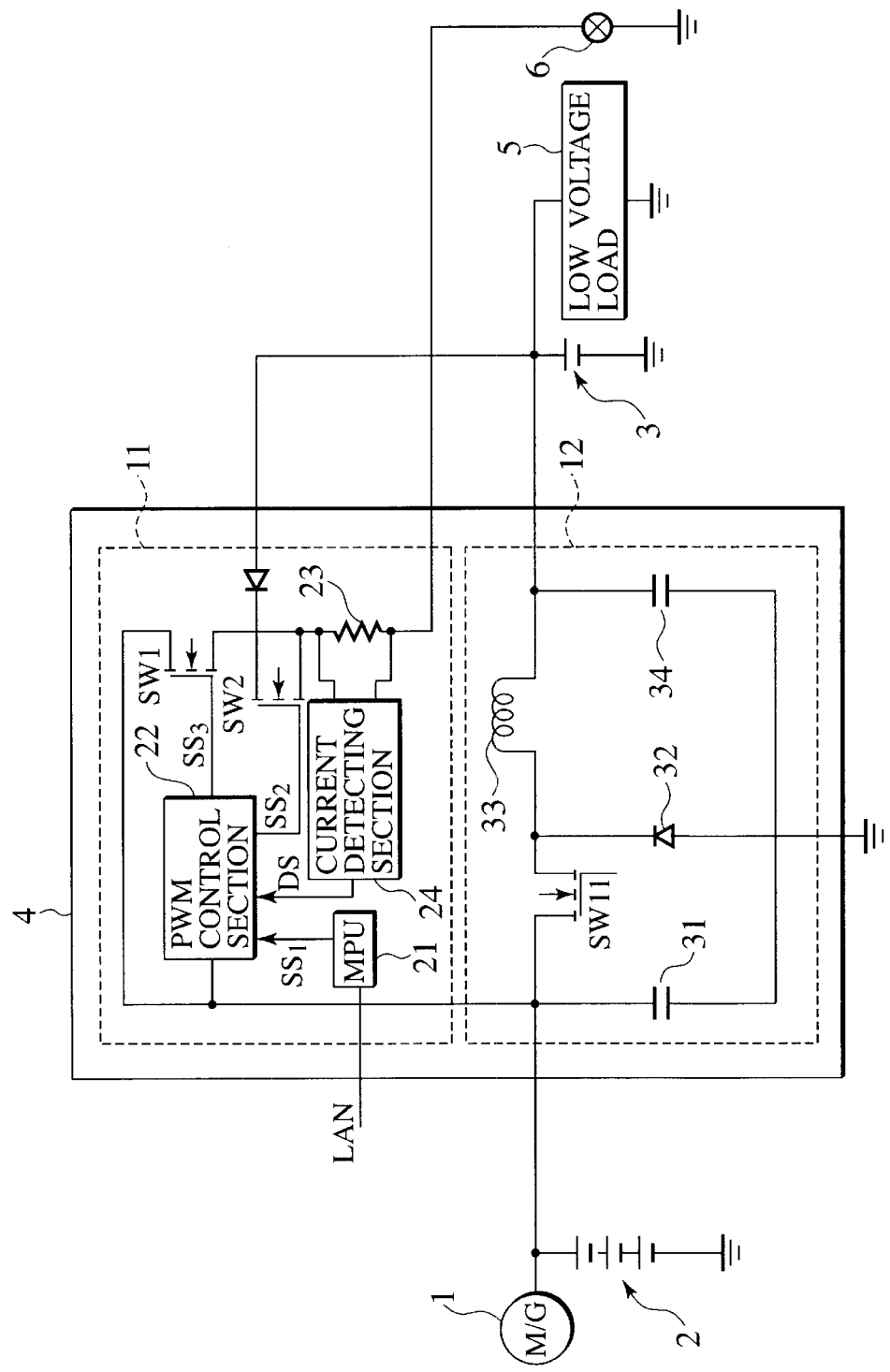
FIG. 2 is circuit diagram showing a configuration of a load driving apparatus according to the present invention.

The present invention is applied to a load driving apparatus, for example, as shown in FIG. 2. For example, the load driving apparatus is mounted on an automobile and supplies a power to a load constituting the automobile. The load driving apparatus is provided with a motor/generator (M/G) 1, a high voltage power source 2 which is connected to the motor/generator 1, a low voltage power source 3 which has a voltage lower than that of the high voltage power source 2, an electric connection portion 4 which is connected to the high voltage power source 2 and the low voltage power source 3, a low voltage load 5 and a lamp load 6.

The motor/generator 1 is a rotary type generator, and it supplies power to the high voltage power source 2. The high voltage power source 2 stores power generated from the motor/generator 1 to supply a high voltage to the electric connection portion 4. The high voltage power source 2 supplies a high voltage (for example 42V) to the electric connection portion 4.

Also, the low voltage source 3 supplies a voltage lower than that of the high voltage power source 2 to the electric connection portion 4. A low voltage supplied from the low voltage power source 3 is, for example, 14V.

The low voltage load 5 is connected to a DC/DC converter described later, and it is driven with a low voltage (14V) from the DC/DC converter. The lamp load 6 is connected to a PWM processing section 11 described later, and after a high voltage has been converted to a pulse voltage, which is regarded as a low voltage, by PWM control performed in the PWM processing section 11, the lamp load 6 is driven with the pulse voltage.

The electric connection portion 4 is provided with the PWM processing section 11 which is connected to LAN (Local Area Network), the high voltage power source 2 via the DC/DC converter 12, the low voltage power source 3, and the lamp load 6, and is provided with the DC/DC converter 12 which is connected to the high voltage power source 2, the low voltage power 3, and the low voltage load 5.

The PWM processing section 11 is provided with a MPU (Micro Processing Unit) 21, a PWM control section 22, a first switching element SW1, a second switching element SW 2, a shunt resistor 23 and a current detecting section 24. The MPU 21 is connected to the LAN. The PWM control section 22 is connected to the high voltage power source 2 via the DC/DC converter 12. The first switching element SW1 is connected to the PWM control section 22, the high voltage power source 2, and the lamp load 6. The second switching element SW 2 is connected to the PWM control section 22, low voltage power source 3, and the lamp load 6. The shunt resistor 23 is provided between the second switching element SW2 and the lamp load 6. The current detecting section 24 detects a value of current flowing in the shunt resistor 23 to supply a detection signal DS to the PWM control section 22. In this embodiment, each of the first switching element SW1 and the second switching element SW2 is FET (Field Effect Transistor), but other switching elements may be used therefor.

The MPU 21 reads a switch signal from multi-signal including an instruction from an instruction generating section (not shown) via the LAN, which allows multi-communication, to generate a switch signal SS1 for controlling the lamp load 6. The MPU 21 is connected to, for example, a lamp switch operated by a vehicle driver (operator) via the LAN, so that the MPU 21 inputs an instruction into the PWM control section 22. The instruction indicates the state of the lamp such as ON or OFF.

The PWM control section 22 is input the switch signal SS1 from the MPU 21 to apply a switching signal SS2, for supplying a voltage from the low voltage power source 3 to the lamp load 6, to the second switching element SW2.

The current detecting section 24 detects a value of current flowing in the shunt resistor 23, thereby detecting a value of lamp current, which is being currently supplied to the lamp load 6, to supply a detection signal DS to the PWM control section 22.

The PWM control section 22 recognizes the value of lamp current which is being supplied to the lamp load 6 on the basis of the detection signal DS from the current detecting section 24, and compares the recognized lamp current value and a predetermined threshold value of a lamp current with each other for controlling operations of the first switching element SW1 and the second switching element SW2.

The DC/DC converter 12 is constituted with a capacitor 31, a switching element SW11, a diode 32, a transformer 33 and a capacitor 34, and is supplied with a high voltage from the high voltage power source 2.

The DC/DC converter 12 turns the switching element SW11 in ON state to supply a high voltage (for example, 42V) from the high voltage power source 2 to the transformer 33, thereby converting the high voltage to a low voltage (for example, 14V). The low voltage is supplied to the low voltage load 5 so that the low voltage load 5 is driven.

The switching element SW11 and the transformer 33 constituting the DC/DC converter 12 are designed so as to change a voltage supplied to the low voltage load 5 from the high voltage power source 2 according to the number of the low voltage loads 5.

Next, operation of the above-describe load driving apparatus for driving the lamp load 6 will be explained with reference to a timing chart shown in FIG. 3.

Figure 1:
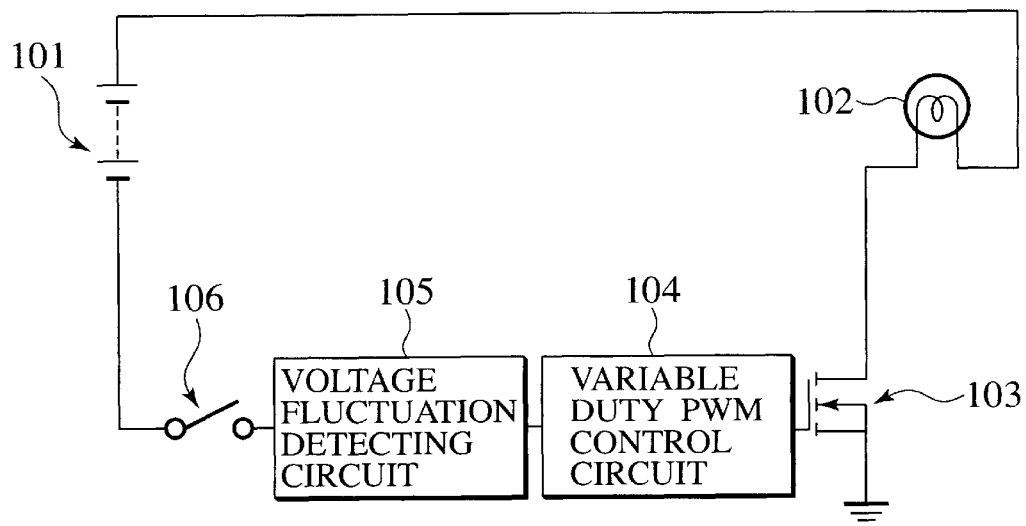
FIG. 1 is a circuit diagram showing a configuration of a conventional load driving apparatus.
Figure 3:
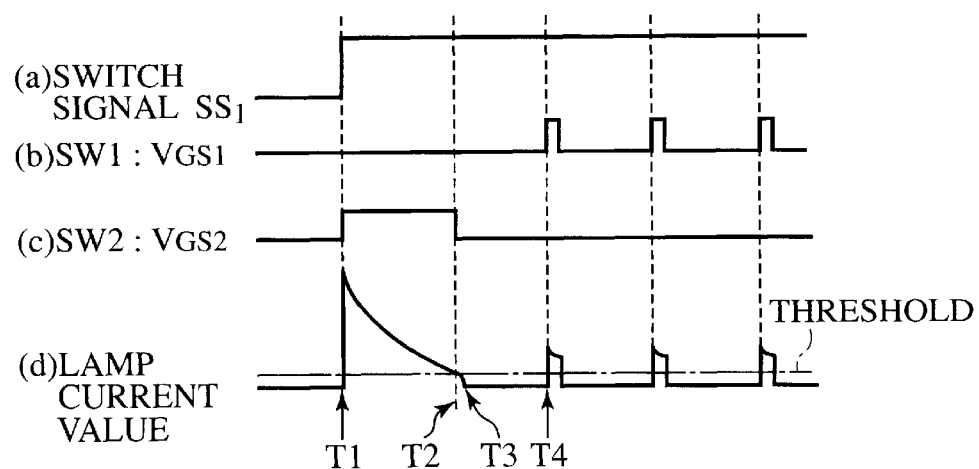
FIG. 3 is a timing chart showing operation of the load driving apparatus according to the present invention.

Referring to FIG. 3, first, an instruction for driving the lamp load 6 is input into the MPU 21 via the LAN at time T1, so that the switch signal SS1 which turns the lamp load 6 in ON state is supplied to the PWM control section 22 from the MPU 21 (refer to (a) in FIG. 3).

In response to this, the second switching element SW2 is turned ON by the PWM control section 22 at time T1 (refer to (c) in FIG. 3), and a low voltage from the low voltage power source 3 is supplied to the lamp load 6 via the second switching element SW2.

When supplying a low voltage to the lamp load 6 starts, the value of current flowing in the shunt resistor 23 is detected by the current detecting section 24 and a rush current is supplied to the lamp load 6 (refer to (d) in FIG. 3). Then, the lamp load 6 starts turning on at time T1 on subsequently thereto, and the temperature of the lamp load 6 rises so that the rush current lowers gradually. Further, while the second switching element SW2 continues to be maintained in the ON state, the value of the lamp current becomes below the threshold value at time T2.

When the current detecting section 24 detects that the value of the lamp current has become below the threshold value at time T2 and the PWM control section 22 recognizes the fact, the second switching element SW2 is turned OFF by the PWM control section 22. Thereby, since both the first switching element SW1 and the second switching element SW2 are turned in OFF state (refer to (b) and (c) in FIG. 3), the value of the lamp current supplied to the lamp load 6 becomes zero at time T3.

In a steady state after the value of the lamp current supplied to the lamp load 6 has become below the threshold value, the first switching element SW1 is ON/OFF-controlled by the PWM control section 22. The high voltage from the high voltage power source 2, therefore, is pulse-controlled according to the duty ratio. As a result, the high voltage of 42V is converted to a pulse voltage as low as the low voltage of 14V, and is supplied to the lamp load 6 at time T4 (refer to (b) in FIG. 3).

By utilizing the load driving apparatus operating in such a manner, since, when driving the lamp load 6 starts, the low voltage from the low voltage power source 3 is supplied to the lamp load 6 via the second switching element SW2, a rush current generated during a period from the time T1 to the time T2 can be reduced, as compared with a case that a high voltage is supplied when driving the lamp load 6 starts. Specifically, when a high voltage of 42V is subjected to a PWM control to be supplied to the lamp load 6 at a time of start of driving the lamp load 6, a rush current reaches several hundreds A (amperes). However, when a low voltage of 14V is supplied to the lamp load 6, the rush current can be reduced to ⅓ of the several hundreds A or so.

In other words, by utilizing the load driving apparatus, just after driving the lamp load 6 starts, that is, when the lamp load 6 is put in a non-steady state, the lamp load 6 can be driven with a low voltage at a low temperature. After the temperature of the lamp load 6 rises sufficiently, that is, after the lamp becomes the steady state, the lamp load 6 is driven at a high voltage which has been subjected to the PWM control as a pulse voltage, so that the rush current at the time of the non-steady state can be suppressed.

Also, in the load driving apparatus, after the lamp load 6 becomes the steady state, since the high voltage, which has been subjected to the PWM control as a pulse voltage, is supplied to the lamp load 6, the value of lamp current flowing in the lamp load 6 is not so increased. Accordingly, overcurrent does not flow in the lamp load 6, and a complex control for suppressing overcurrent or a switching element having a large allowable current value is not required.

Furthermore, by utilizing the load driving apparatus, the lamp load 6 is driven by means of the PWM control except for the non-steady state of the lamp load 6, so that the amount of power to be handled by the DC/DC converter 12 can be reduced.

Moreover, according to the load driving apparatus, even when the lamp load 6 is driven at a time of OFF of an ignition switch of the vehicle, the second switching element SW2 is controlled and only the low voltage power source 3 is used. Therefore, burden of the high voltage power source 2 which actuates a starter of the vehicle can be suppressed.

Incidentally, the above-describe embodiment is only one example of the present invention. Therefore, the present invention is not limited to the above-described embodiment, and various modifications can be employed according to a design or the like within the scope and spirit of the technical idea according to the present invention besides this embodiment.

That is, in the above-described embodiment, one example, where the load driven by the high voltage power source 2 and the low voltage power source 3 is the lamp load, has been explained, but the present invention is applicable to a load which can withstand a rush current occurring at a time of driving start and which can be driven with a high voltage which has been subjected to the PWM control as a pulse voltage after a steady state is reached.

What is claimed is:

1. A load driving apparatus comprising:
   a first switching element which is connected to a first power source supplying a first voltage and connected to a load;
   a second switching element which is connected to a second power source supplying a second voltage lower than the first voltage and connected to the load;

current detecting means which detects a value of current flowing in the load; and control means which is connected the first switching element, the second switching element, and the current detecting means to control a voltage to be supplied to the load, wherein the control means turns the second switching element into ON state at first, continues to supply the second voltage from the second power source to the load while the value of current detected by the current detecting means is more than a predetermined value, and turns the second switching element in OFF state and drives the first switching element to supply the first voltage from the first power source to the load once the value of current detected by the current detecting means becomes below the predetermined value.

2. A load driving apparatus according to claim 1, further comprising direct current voltage converting means which is connected to the first power source and which lowers the first voltage.

3. A load driving apparatus according to claim 1, wherein the first voltage from the first power source is converted to a pulse voltage by means of the direct current voltage converting means having PWM (Pulse Width Modulation) control and is supplied to the load.

4. A load driving apparatus according to claim 1, wherein the current detecting means detects a value of current flowing in a resistor provided between the second switching element and the load.

5. A load driving apparatus according to claim 1, wherein the load is a lamp.

6. A load driving apparatus according to claim 1, wherein the predetermined value is set to a value indicating that the load has become a steady state.

* * * * *